United States Patent

Mühlfenzl

(10) Patent No.: US 10,856,390 B2
(45) Date of Patent: Dec. 1, 2020

(54) SYNCHRONIZATION OF DIMMER CONTROLS

(71) Applicant: Siemens Schweiz AG, Zürich (CH)

(72) Inventor: Christian Mühlfenzl, Regensburg (DE)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/491,268

(22) PCT Filed: Feb. 15, 2018

(86) PCT No.: PCT/EP2018/053742
§ 371 (c)(1),
(2) Date: Sep. 5, 2019

(87) PCT Pub. No.: WO2018/162197
PCT Pub. Date: Sep. 13, 2018

(65) Prior Publication Data
US 2020/0037415 A1    Jan. 30, 2020

(30) Foreign Application Priority Data

Mar. 6, 2017 (DE) .......... 10 2017 203 593

(51) Int. Cl.
| H05B 47/11 | (2020.01) |
| H05B 45/20 | (2020.01) |
| H05B 47/18 | (2020.01) |
| H05B 47/16 | (2020.01) |
| H05B 45/10 | (2020.01) |
| H05B 47/19 | (2020.01) |

(52) U.S. Cl.
CPC ............ *H05B 47/11* (2020.01); *H05B 45/10* (2020.01); *H05B 45/20* (2020.01); *H05B 47/16* (2020.01); *H05B 47/18* (2020.01); *H05B 47/19* (2020.01)

(58) Field of Classification Search
CPC .... H05B 37/0218; H05B 47/11; H05B 47/16; H05B 47/18; H05B 47/19; H05B 45/10; H05B 45/20
See application file for complete search history.

(56) References Cited

U.S. PATENT DOCUMENTS

| 4,396,871 A | 8/1983 | Scheuermann | 315/291 |
| 8,058,815 B1 | 11/2011 | Hardy | 315/291 |

(Continued)

FOREIGN PATENT DOCUMENTS

| DE | 10 2012 105 725 A1 | 1/2013 | G05D 25/02 |
| DE | 10 2013 005 788 A1 | 10/2014 | G05D 25/02 |
| GB | 2 493 054 | 1/2013 | H05B 33/08 |

OTHER PUBLICATIONS

Search Report for International Application No. PCT/EP2018/053742, 6 pages, dated May 4, 2018.

*Primary Examiner* — Raymond R Chai
(74) *Attorney, Agent, or Firm* — Slayden Grubert Beard PLLC

(57) ABSTRACT

Various embodiments include a lighting system comprising: a first light; a second light; a first controller for adjusting a first brightness of the first light; a second controller for adjusting a second brightness of the second light; and a generator for generating a trigger signal. The first controller and the second controller are initiated by the trigger signal, to simultaneously start a control computation procedure.

9 Claims, 1 Drawing Sheet

(56) References Cited

U.S. PATENT DOCUMENTS

| | | | |
|---|---|---|---|
| 2011/0181196 A1 | 7/2011 | Kang | 315/246 |
| 2012/0050606 A1* | 3/2012 | Debevec | G03B 15/07 348/370 |
| 2012/0319592 A1 | 12/2012 | Riesebosch | 315/152 |
| 2013/0320862 A1* | 12/2013 | Campbell | H05B 45/10 315/152 |
| 2014/0265870 A1* | 9/2014 | Walma | H05B 47/105 315/151 |
| 2016/0027262 A1 | 1/2016 | Skotty | 340/541 |
| 2016/0234907 A1* | 8/2016 | Joseph | H05B 45/22 |
| 2016/0255698 A1 | 9/2016 | Harbers | 315/151 |

\* cited by examiner

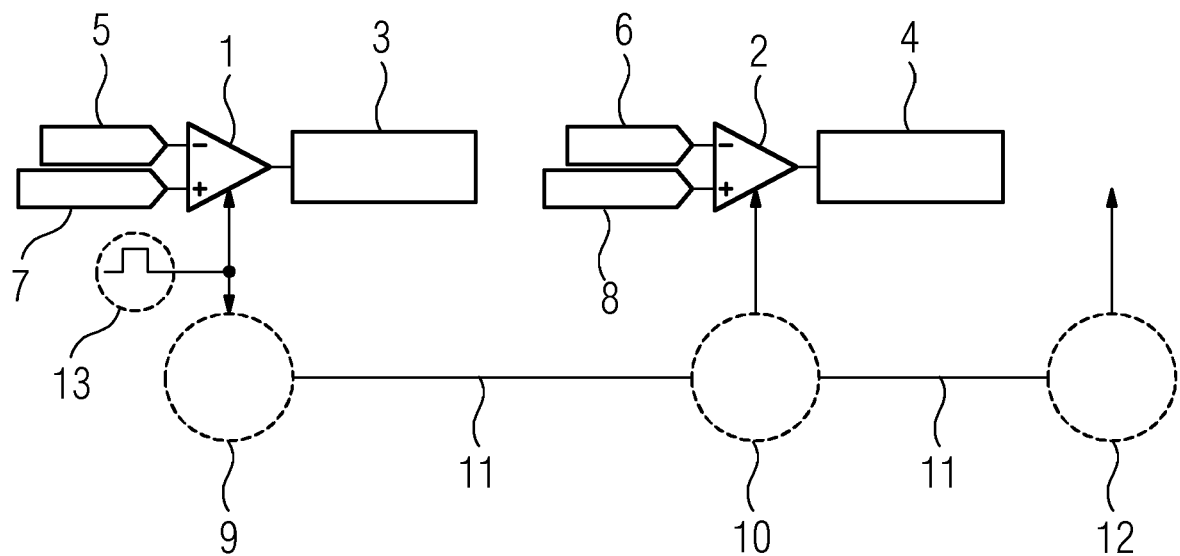

SYNCHRONIZATION OF DIMMER CONTROLS

CROSS-REFERENCE TO RELATED APPLICATIONS

This application is a U.S. National Stage Application of International Application No. PCT/EP2018/053742 filed Feb. 15, 2018, which designates the United States of America, and claims priority to DE Application No. 10 2017 203 593.5 filed Mar. 6, 2017, the contents of which are hereby incorporated by reference in their entirety.

TECHNICAL FIELD

The present disclosure relates to lighting systems. Various embodiments include a first lighting device, a second lighting device, a first control device for controlling a brightness of the first lighting device and a second control device for controlling a brightness of the second lighting device.

BACKGROUND

Often a space is illuminated with a lighting system which comprises a plurality of lighting devices. It is herein favorable if the brightness of each lighting device is controlled to save energy when sufficient daylight is available. For this purpose, a sensor which senses the actual brightness is necessary and it is required that a target value is specified, for example, by a user. The difference between the actual value and the target value is used by a controller in order to generate a manipulated variable for a dimmer of the lighting device. A fundamental precondition for the brightness control is therefore also that each lighting device is dimmable.

If a plurality of dimmer controls including respective sensors and lighting devices is operated simultaneously in a space, they can influence one another. In particular, the simultaneous operation can lead thereto that the dimmer controls start to oscillate and thus the brightness periodically varies severely. If applicable, one of the lighting devices is also operated with maximum lighting power, whereas another device is operated with a very low brightness or is even completely switched off. However, this is not the behavior that is desired by the user.

Previously, the attempt has been made to circumvent the aforementioned problem in that only a single controller is utilized. Different brightness values within a space are achieved in that the manipulated variable of a controller for individual (groups of) lamps is modified in a targeted manner with an offset or factor.

SUMMARY

The teachings of the present disclosure may be used to prevent unwanted brightness variations in a space that is illuminated with a plurality of lighting devices. For example, some embodiments include a lighting system having a first lighting device (3), a second lighting device (4), a first control device (1) for controlling a brightness of the first lighting device (3), and a second control device (2) for controlling a brightness of the second lighting device (4), characterized by a generator apparatus (13) for generating a trigger signal, wherein the first control device (1) and the second control device (2) are configured such that initiated by the trigger signal they start a control computation procedure simultaneously.

In sortie embodiments, the control devices (1, 2) are interlinked with one another by means of a communication network (11), via which the trigger signal is transferrable from the generator apparatus (13) to the control devices (1, 2).

In some embodiments, each of the control devices (1, 2) having a separate sensor with which a measure for the brightness is detectable.

In some embodiments, the trigger signal is generatable cyclically by the generator apparatus (13).

In some embodiments, there is at least one further control device, wherein all the control devices are synchronizable with the trigger signal.

In some embodiments, each of the control devices (1, 2) comprising a constant light controller for building services engineering.

In some embodiments, a cycle time of the trigger signal emitted by the generator apparatus (13) lies between 1 s and 10 min.

In some embodiments, a PI behavior of all the control devices (1, 2) is substantially identical.

In some embodiments, all the control devices (1, 2) have the same control algorithm.

As another example, some embodiments include a method for operating a lighting system having a first lighting device (3), a second lighting device (4), a first control device (1) and a second control device (2), by means of controlling a brightness of the first lighting device (3) by means of the first control device (1), and controlling a brightness of the second lighting device (4) by means of the second control device (2), characterized by generating a trigger signal, wherein the first control device (1) and the second control device (2) each start a control computation procedure simultaneously, initiated by the trigger signal.

BRIEF DESCRIPTION OF THE DRAWINGS

The teachings of the present disclosure are described in greater detail making reference to the accompanying single FIGURE which represents schematically a block circuit diagram of a plurality of synchronized controllers of a lighting system.

DETAILED DESCRIPTION

In some embodiments, there is a lighting system with a first lighting device and a second lighting system. Naturally, the number of lighting devices can be greater than two as desired. A lighting device should be understood as any means that is suitable for illuminating a space.

In some embodiments, the lighting system further comprises a first control device for controlling a brightness of the first lighting device and a second control device for controlling a brightness of a second lighting device. This means that each lighting device has its own control device in order to control the respective brightness individually. The control devices thereby each adopt an actual value and, on the basis of a specified target value, generate a manipulated variable for each lighting device.

To prevent an undesirable oscillation of the control devices and the lighting devices, the control devices are synchronized. For this purpose, the lighting system is equipped with a generator apparatus to generate a trigger signal (=synchronization signal) or, for example, the first control device is configured as master and the second control device as slave. If more than two control devices are present, then each of the further control devices is also operated as a slave. This means that the entire lighting system can comprise a generator apparatus or a master and many slaves. The generator apparatus or the master provides for the synchronization with the slave or the slaves.

For this purpose, the second control device, i.e. the slave, is triggerable by the generator apparatus or the first control device, i.e. the master, such that the second control device starts a control computation procedure precisely when the first control device starts a control computation procedure. This means that the master and the slave or the slaves, i.e. all the control devices, start a control computation procedure simultaneously. By this means, the control devices are temporally synchronized. If this is the case, oscillations of the control devices and of the lighting devices no longer occur. Similarly, the case cannot arise that one lighting device is set to full output and the other lighting device is switched off or operated at minimum.

The control of the lighting system is generally necessary since the intensity of the daylight varies naturally. In order thus to prevent unnecessary illumination and to save energy, the artificial lighting is controlled.

In some embodiments, the control devices are interlinked with one another. The interlinking can be wire-bound or wireless. Each control device then represents a node point of the network. The interlinking possibly takes place by means of a bus. A bidirectional data communication between the control devices is possible where appropriate.

In some embodiments, each of the control devices can have a separate sensor with which a measure for the brightness is detectable. The sensor thus serves as an actual value sensor with regard to the brightness for a control device. A control device and an associated sensor can be arranged on one another, although they can also be spatially separate from one another. The same applies for the spatial relationship between the control device and the corresponding lighting device. They also do not nave to be arranged directly on one another.

For example, in order to illuminate a desk, a ceiling light can be used. The mounting of a sensor in the immediate vicinity of the desk would bring optimum success for a control. If, however, the sensor would interfere in the immediate vicinity or directly on the desk, it can also be installed on the ceiling and receive the reflected light from the desk there (=indirect brightness measurement). In this case, the lighting device, the control device and the sensor could be arranged directly on one another. In the other case that the sensor is placed on the desk, the control device can be arranged immediately by the sensor or by the lighting device. The only precondition is a communication possibility between each individual component.

In some embodiments, a trigger signal is emitted cyclically by the generator apparatus or the master to the slave or all the control devices in order to synchronize the control devices or the master with the slave. It is therefore possible to adjust the master to the slaves or all the control devices among one another temporally at particular temporal intervals. It is herein not necessary for such a trigger signal to be transferred at the start of each control computation procedure. It is therefore also possible, for example, that for instance five control processes are carried out, but that a trigger signal is transferred from the master to the slave or the slaves only during the first of these five control computation procedures. Only at the joint start of the sixth control computation procedure in all the control devices is a trigger signal emitted by the master again. The number five is naturally only by way of example and can be varied at will. In an extreme case, a new trigger signal is transferred for each control computation procedure.

In some embodiments, the lighting system can have more than two control devices so that the generator apparatus or the master triggers at least two slaves or a large number of slaves, in particular all the slaves. Thereby, the communication with the individual slaves can be wire-bound or wireless throughout. However, mixed forms are also conceivable. Thus, for example, the master can communicate wirelessly with a slave and the latter passes on the trigger signal in a wire-bound manner to an adjacent slave. Thus, for example, islands with groups of slaves are formed and addressed.

In some embodiments, each of the control devices comprises a constant light regulator for building services engineering. The control devices are therefore configured such that together with their respective lighting devices, they provide for a constant brightness in a space region. Such constant light controllers can fulfil the relevant norms and standards for building services engineering.

In some embodiments, the cycle time of the trigger signal emitted by the master lies between 1 s and 10 min. This cycle time of the trigger signal can match the cycle time of the control computation procedures, although it does not have to. Thus, similarly as set out above, for example, every 10 min, a trigger signal is transferred from the master to the slaves, whilst the control computation procedures can be carried out internally in the control devices in shorter intervals. It is also not necessary for all the control devices always to carry out a control computation procedure simultaneously. For example, a control device can carry out two regulation computation procedures, while another control device carries out a single control computation procedure exactly synchronized, for example, with the first of the two control computation procedures in the same time period. The number of control computation procedures per trigger cycle can be selected practically arbitrarily. It is essential only that the control computation procedures of the individual control devices are temporally matched to one another and not that they can assume any arbitrary phases to one another. In this regard, it is favorable that the trigger signals are transferred at a low frequency in order to load the communication bus or the corresponding communication connection as little as possible.

In some embodiments, a PI behavior of all the control devices is substantially identical. The individual control devices or their regulating algorithms thus have at best variations with regard to their control behavior, the consequences of which in the illumination of a space are barely visible to the human eye.

In some embodiments, all the control devices have the same control algorithm. By this means, it can be ensured that all the control devices act synchronously and cannot influence one another negatively.

As another example, some embodiments include a method for operating a lighting system having a first lighting device, a second lighting device, a first control device and a second control device, by means of
  controlling a brightness of the first lighting device by means of the first control device, and
  controlling a brightness of the second lighting device by means of the second control device, and
  generating a trigger signal, wherein
  the first control device and the second control device each start a control computation procedure simultaneously, initiated by the trigger signal.

The variation possibilities and advantages set out above in relation to the lighting system apply similarly also for the methods described herein. The example embodiments set out in greater detail below represent only embodiments of the teachings of the present disclosure. It should be noted herein that the individual features can be realized not only in the combinations described, but also alone or in other technically useful combinations.

A lighting system incorporating teachings of the present disclosure can be utilized in a building, but also, for example, in an outdoor facility. It possesses a plurality of lights which are also designated lighting devices in the present document. At least two lighting devices are provided. Each lighting device can have one or more lamps.

A control device is associated with each of the lighting devices. A control device can be arranged in the housing or outside the housing of each lighting device. In each case, a corresponding signal connection exists between the control device and the associated lighting device.

In some embodiments, the control devices of the lighting devices are synchronized. This means that the at least two control devices of the lighting system start a control computation procedure simultaneously. The drawing shows an example of a lighting system with synchronization of control devices 1, 2.

As shown, the first controller 1 controls a first lighting device 3 and the second controller 2 controls a second lighting device 4. Each controller 1, 2 receives as input values an actual value 5, 6 and a target value 7, 8. The target values 7, 8 are, for example, stored in the controller as fixed setpoints. The target values 7, 8 can however also be adjustable. The actual values 5, 6 come from the respective sensors. Such sensors can be arranged directly on the respective control device 1, 2 or on the associated lighting device 3, 4. Alternatively, the sensors can also be physically separated from each control device 1, 2 or lighting device 3, 4. In some embodiments, a suitable signal connection exists to each control device 1, 2.

From the aforementioned input variables, i.e. the actual values 5, 6 or the target values 7, 8, the respective control devices 1, 2 generate manipulated variables which are fed to the associated lighting devices 3, 4. Such a manipulated variable can be used, for example, to dim the respective lighting device 3, 4.

It is the aim to illuminate a space or an area in a pre-determined manner constantly or semi-constantly (according to a pre-determined dynamic), whereby the individual lighting devices 3, 4 are regulated, in their brightness by the associated control devices 1, 2. The lighting devices 3, 4 or their lamps are thus dimmable accordingly.

The example according to the single figure comprises only two lighting devices 3, 4 and corresponding control devices 1, 2. However, a lighting system incorporating the teachings herein can also comprise more lighting devices and accordingly more control devices. The respective numbers can be selected according to need.

If the plurality of control devices 1, 2 were to be operated unsynchronized, this can lead thereto that although they function with the same cycle time, in the course of time they operate phase-shifted. The cause thereof lies in the tolerances of the oscillators used in the devices.

The use of the plurality of lighting devices 3, 4 and of their control devices 1, 2 in a space leads thereto that they are optically coupled to one another. Thus, not only the first lighting device 3 influences the actual value 5 supplied by a sensor for the first control device 1, but also the second lighting device 4. Conversely, both the first lighting device 3 and also the second lighting device 4 influences the actual value 6 that a sensor for the second control device 2 supplies.

By means of the optical coupling of the plurality of control devices 1, 2 in a space or in a limited environment, it can occur through its phase-displacement that a brightness increase of the first lighting device 3 (caused by the first control device 1) causes a brightness reduction of the second lighting device 4 (caused by the second control device 2) or vice versa. In the worst case, this means that each control device 1, 2 provides an extreme-valued manipulated variable (0% or 100%) or that an oscillation arises. Both are undesirable. With a synchronization of the control devices of all the control devices involved in the brightness, this can be prevented.

In the drawing, one possibility is shown for realizing the synchronization of the plurality of control devices 1, 2. For example, the control devices 1 and 2 each have a communication interface 9, 10. These communication interfaces 9, 10 can be connected to one another via a communication bus 11. The communication bus can be, for example, a KNX bus. It can also, however, be another field bus, in particular for building automation, such as the BACnet bus.

In the example of the drawing, it is shown that further communication interfaces 12 can also be connected to the communication bus 11. In particular, further control devices can be supplied with bus signals at these further communication interfaces 12, of which only one is shown by way of example.

In the communication bus 11, a trigger signal can be fed in by a generator apparatus 13. This trigger signal (e.g. a square-wave pulse) can be fed via a communication interface 9, 10, 12 of a respective control device 1, 2. If a control device 1, 2 receives this trigger signal, then it starts a control computation procedure. In some embodiments, the control device is awoken by the trigger signal and is only active until the control computation procedure is concluded again.

In some embodiments, the generator apparatus 13 can be a separate device which feeds the trigger signal into the communication bus 11. In some embodiments, the generator apparatus 13 can be annexed to the first control device 1 or integrated into it. By this means, the first control device 1 is given a master functionality with regard to the triggering of the control computation procedures of the individual control devices. The second control device 2 would thus be a slave which receives the trigger signal from the master, specifically the first control device 1. If the generator apparatus 13 is a separate device, each control device 1, 2 and so forth can be regarded as a slave.

The control devices may all show at least similar behavior. In this way, the synchronization can develop an optimum effect. In some embodiments, the PI behavior of the individual control devices is substantially the same. In some embodiments, all the control devices have exactly the same control algorithm. In this event, the synchronization, of all the control devices may be improved.

In some embodiments, the actual value acquisition is as fast as possible. This means that the reaction time of the respective sensors should be as low as possible. In some embodiments, the actual value acquisition may be the same for all the control devices. Thus, it can again be ensured that all the control computation procedures take place synchronously under the same conditions.

In some embodiments, all the control devices or dimmer controls can be interlinked with one another and have the same control algorithm. One control device is defined as the master and the remaining control devices as slaves. By means of the coupling, it is possible that the master sends a trigger signal cyclically to the slaves. In some embodiments, this trigger signal is then output by the master when it starts a new control computation procedure and thereby synchronizes the slaves.

Control devices or constant light controllers for building services engineering typically function very sluggishly. The reaction times or cycle times (a clock cycle of a trigger signal) are typically between 1 s and several minutes. This has the advantage that the trigger signals of the master that are required do not load the communication bus excessively and brightness corrections by the user are perceived only indirectly.

In some embodiments, it is possible by means of the above-described exemplary embodiments of lighting systems that the individual control devices are synchronized. This lessens the risk that the manipulated variables are unintentionally driven to extreme values or undergo oscillations.

REFERENCE SIGNS

1 Controller
2 Controller
3 Lighting device
4 Lighting device
5 Actual value
6 Actual value
7 Target value
8 Target value
9 Communication interface
10 Communication interface
11 Communication bus
12 Communication interface
13 Generator apparatus

What is claimed is:

1. A lighting system comprising:
a first light;
a second light;
a first controller for adjusting a first brightness of the first light;
a second controller for adjusting a second brightness of the second light; and
a transmitter for sending a trigger signal;
wherein the transmitter sends the trigger signal to the first controller and the second controller, and
the trigger signal causes the first controller to start a first predetermined number of control computation procedures including sensing a brightness level and computing the respective brightness of the respective lights; and
the trigger signal causes the second controller to start a second predetermined number of control computation procedures, wherein the second predetermined number is less than the first predetermined number, and wherein each control computation procedure of the second controller is synchronized to start simultaneously with one of the control computation procedures of the first controller.

2. The lighting system as claimed in claim 1, wherein the first controller is interlinked with the second controller by a communication network transferring the trigger signal from the first controller to the second controller.

3. The lighting system as claimed in claim 1, wherein each controller includes a respective sensor detecting a measure of an ambient brightness.

4. The lighting system as claimed in claim 1, wherein the first controller cyclically generates the trigger signal.

5. The lighting system as claimed in claim 4, wherein a cycle time of the trigger signal lies between 1 s and 10 min.

6. The lighting system as claimed in claim 1, further comprising a further controller, wherein all the controllers are configured to synchronize with the trigger signal.

7. The lighting system as claimed in claim 1, wherein each controller comprises a constant light controller for building services engineering.

8. The lighting system as claimed in claim 1, wherein all the controllers share a single control algorithm.

9. A method for operating a lighting system having a first light, a second light, a transmitter, a first controller, and a second controller, the method comprising:
controlling a first brightness of the first light with the first controller;
controlling a second brightness of the second light with the second controller; and
sending a trigger signal with the transmitter to the first controller and the second controller;
wherein the trigger signal causes the first controller to start a first predetermined number of control computation procedures including sensing a brightness level and computing the respective brightness of the respective lights; and
the trigger signal causes the second controller to start a second predetermined number of control computation procedures, wherein the second predetermined number is less than the first predetermined number, and wherein each control computation procedure of the second controller is synchronized to start simultaneously with one of the control computation procedures of the first controller.

\* \* \* \* \*